United States Patent [19]

Coleman

[11] 3,956,149

[45] *May 11, 1976

[54] NITROGEN-CONTAINING ESTERS AND LUBRICANTS CONTAINING SAME

[75] Inventor: Lester E. Coleman, Willoughby Hills, Ohio

[73] Assignee: The Lubrizol Corporation, Cleveland, Ohio

[ * ] Notice: The portion of the term of this patent subsequent to May 25, 1993, has been disclaimed.

[22] Filed: Oct. 6, 1971

[21] Appl. No.: 187,129

Related U.S. Application Data

[63] Continuation-in-part of Ser. No. 843,180, July 18, 1969, abandoned.

[52] U.S. Cl. .............................. 252/51.5 A; 44/62; 44/71
[51] Int. Cl.$^2$ ......................................... C10M 1/32
[58] Field of Search ............. 252/51.5 A; 44/62, 71; 260/78.5 T

[56] References Cited
UNITED STATES PATENTS

| | | | |
|---|---|---|---|
| 2,615,845 | 10/1952 | Lippincott et al. | 252/51.5 A X |
| 3,219,666 | 11/1965 | Norman et al. | 252/51.5 A X |
| 3,329,658 | 7/1967 | Fields | 252/51.5 A X |
| 3,702,300 | 11/1972 | Coleman | 252/51.5 A X |

*Primary Examiner*—Delbert E. Gantz
*Assistant Examiner*—Andrew H. Metz
*Attorney, Agent, or Firm*—James W. Adams, Jr.

[57] ABSTRACT

This invention is directed to a nitrogen-containing ester of a carboxy-interpolymer having a reduced specific viscosity ranging from about 0.05 to 2.0. The carboxy-interpolymers, from which the nitrogen-containing esters are obtained, are derived from at least one monomer selected from the class consisting of aliphatic olefins and styrene and at least one monomer comprising an unsaturated carboxylic acid, the anhydride or ester thereof. The nitrogen-containing ester may be characterized as having in the polymeric structure carboxylic-ester groups derived from a high molecular weight alcohol having at least 7 aliphatic carbon atoms and carbonyl-polyamino groups derived from hydrazine or a hydrocarbon-substituted hydrazine. The nitrogen-containing ester may be used alone or in combination with other additives in small but effective amounts in various oleaginous materials including lubricants and fuels.

20 Claims, No Drawings

NITROGEN-CONTAINING ESTERS AND LUBRICANTS CONTAINING SAME

This application is a continuation-in-part of copending application Ser. No. 843,180 filed on July 18, 1969 and now abandoned.

This invention relates to a nitrogen-containing ester of a carboxy-containing interpolymer, and more specifically, to an oil soluble, nitrogen-containing ester or a mixed ester of a carboxy-containing interpolymer having a reduced specific viscosity ranging from about 0.05 to about 2.0. These nitrogen-containing esters may be used as additives in a variety of oleaginous materials including, for example, lubricating oils, hydraulic fluids, fuels, e.g., liquid fuels, such as gasoline, diesel fuel, industrial oils and the like. The nitrogen-containing esters of this invention are prepared by reacting the carboxy-interpolymer with a hydroxy compound, e.g., one or more alcohols and hydrazine or a hydrocarbon-substituted hydrazine. The carboxy-interpolymers, from which the esters are prepared, are derived from at least one hydrocarbon monomer, e.g., a low molecular weight olefin or styrene and an unsaturated carboxylic acid or a derivative thereof, e.g., the anhydride or ester of said acid.

Presently, various oil soluble detergents or dispersants, and the like are being used as additives in lubricants and fuels for internal combustion engines, power-transmitting units, gears, etc. While these additives have achieved widespread acceptance there is still need for materials which will inhibit the deterioration and improve the viscosity of the oils, particularly when used in internal combustion engines. It is generally known, for example, that the deterioration of the motor oil during the operation of the engine causes the formation of sludge, varnish, oxidation products, etc., which deposit in the engine causing a malfunction and premature breakdown. Thus, there is need to upgrade and improve the function of these additives particularly when used as a multipurpose additive, e.g., for improving the viscosity and anti-sludge characteristics, etc., of various fuels and lubricants.

One of the problems associated with multifunction additives is that it is difficult to achieve the proper balance of the different characteristics so that each characteristic can manifest itself fully under actual service conditions. It is known, for example, that for a polymeric material to function as a viscosity-improving additive said material must have a sufficient but limited solubility in the oil at ordinary temperatures. The additive must be sufficiently soluble to be incorporated in the oil at the desired concentration while at the same time have a limit on its solubility so as not to impart the full viscosity-modifying properties until the change in temperature takes place under actual service conditions. For example, as the temperature of the oil increases, the additive becomes more soluble and thereby imparts its thickening effect and prevents excessive thinning of the oil. The dual requirement of obtaining a limited solubility while maintaining a sufficient solubility to obtain a satisfactory result are conditions which are not easy to accomplish. The problems of improving a motor oil, for example, are further complicated if the additive is being used to improve not only the viscosity index characteristics but also to improve other properties such as anti-wear, anti-sludge, etc. Thus it was found, for example, that some of these problems may be avoided by incorporating within the molecular structure of the additive one or more groups, e.g., ester or amino groups, which are capable of imparting the necessary detergent or dispersant characteristics, etc., without adversely affecting the solubility needed to improve the viscosity.

Accordingly, it is an object of this invention to provide a nitrogen-containing ester of a carboxy-interpolymer which may be used in various oleaginous materials. It is another object of this invention to provide a nitrogen-containing ester or a mixed ester of a carboxy-interpolymer as an additive for various lubricants and fuels. It is still another object of this invention to provide a process for preparing a nitrogen-containing ester or a mixed ester of a carboxy-interpolymer which may be used as a multipurpose additive for lubricants and fuels. It is still a further object of this invention to provide a nitrogen-containing ester or a mixed ester of a carboxy-interpolymer which may be used specifically as an anti-sludge and viscosity-index improving agent for motor oils and the like.

These and other objects of the invention are accomplished by providing a nitrogen-containing ester or a mixed-ester of a carboxy-interpolymer having a reduced specific viscosity ranging from about 0.05 to about 2.0 and preferably ranging from about 0.3 to 1.0. The carboxy-interpolymers, from which the nitrogen-containing esters are prepared, are derived from at least one monomer selected from the class consisting of aliphatic olefins, e.g., low molecular weight olefins having 2 to 8 aliphatic carbon atoms per molecule and styrene and at least one monomer selected from the class containing of $\alpha,\beta$-unsaturated carboxylic acids, the anhydrides or esters of said acids. The nitrogen-containing esters of the carboxy interpolymes may be characterized as having within the polymeric structure (A) a carboxylic-ester group derived from at least one high molecular weight alcohol having at least 7 aliphatic carbon atoms and (B) a carbonyl-polyamino group derived from hydrazine or a hydrocarbon-substituted hydrazine. The nitrogen-containing mixed esters of the carboxy interpolymers may be characterized as having within the polymeric structure (A) carboxylic-ester groups derived from at least one high molecular weight alcohol having at least 7 aliphatic carbon atoms and at least one low molecular weight alcohol having from 1 to 6 aliphatic carbon atoms and (B) carbonyl-polyamino groups derived from hydrazine or a hydrocarbon-substituted hydrazine.

In preparing the mixed esters of the carboxy-interpolymers, the high molecular weight alcohol having at least 7 aliphatic carbon atoms may be used in a molar ratio ranging from about 1 to 10 moles of said high molecular weight alcohol for every mole of said low molecular weight alcohol. The carboxylic-ester groups of said nitrogen-containing esters are present in molar ratios of about 2.0 to 50 and preferably in molar ratios of about 3 to 20 for each carbonyl-polyamino group derived from said hydrazine or hydrocarbon-substituted hydrazines.

An essential element of this invention is the presence of the carboxylic-ester groups which are pendant to the principal chain of the interpolymer. The molecular size of these carboxylic-ester groups may be represented by the formula —C(O)OR wherein the number of carbon atoms in the ester radical is the combined number of carbon atoms in the carbonyl group and the carbon atoms in the ester group, i.e., the (+OR) group. Another essential element is the presence of the carbonyl-polyamino groups which are derived from hydrazine or a hydrocarbon-substituted hydrazine and are present in the molecular structure of the ester. These carbonyl-polyamino groups, e.g., derived from hydrazine, etc., not only enhance the anti-sludge properties but also impart the desired solubility characteristics to the nitrogen-containing esters. The relative proportion of the carboxylic-ester group to the carbonyl-polyamino group may be expressed in terms of molar ratios which may range from about 2.0 to 50 and preferably from about 3.0 to 20 molar proportions of said carboxylic-ester group for each molar proportion of said carbonyl-polyamino group. The term "carbonyl-polyamino group" is used for purposes of this invention to describe, generically, the groups derived from the carboxy groups, e.g., carboxylic-acid groups of the interpolymer and hydrazine or a substituted hydrazine.

In preparing the nitrogen-containing esters of the carboxy-containing interpolymers, at least about 50 molar percent of the carboxylic groups of said interpolymer may be esterified with at least one high molecular weight alcohol or in the alternative, a mixture of a high molecular weight and a low molecular weight alcohol. Preferably, from about 50 to 98 molar percent of the carboxylic groups of the interpolymer may be esterified with at least one high molecular weight alcohol having at least 7 aliphatic carbon atoms and preferably from about 7 to 40 aliphatic carbon atoms either alone or in combination with at least one low molecular weight aliphatic alcohol having from 1 to 6 aliphatic carbon atoms and preferably from about 2 to 6 aliphatic carbon atoms. The remaining unesterified groups, e.g., carboxylic-acid groups, are reacted with effective amounts of hydrazine or a substituted hydrazine to obtain the nitrogen-containing esters.

For purposes of this invention, it is important that the nitrogen-containing esters have a particular average molecular weight, which may be expressed in terms of the "reduced specific viscosity", ranging from about 0.05 to about 2.0. The term "reduced specific viscosity" is widely recognized as a means of expressing the molecular size of a polymeric material and as used herein said reduced specific viscosity (abbreviated as RSV) is the value obtained in accordance with the formula:

$$RSV = \frac{\text{Relative Viscosity} - 1}{\text{Concentration}}$$

wherein the relative viscosity is determined by measuring, by means of a Dilution Viscometer, the viscosity of a solution of one gram of the interpolymer in 100 ml. of acetone and the viscosity of acetone at 30°± 0.02°C. For purposes of computation, by the above formula, the concentration is adjusted to 0.4 gram of the interpolymer per 100 ml. of acetone. A more detailed description of the reduced specific viscosity, also known as the specific viscosity, as well as its relationship to the average molecular weight of an interpolymer is set forth by Paul J. Florey, in Principals of Polymer Chemistry, (1953 Edition), page 408 et seq.

While the interpolymers, from which the nitrogen-containing esters are prepared, may have a reduced specific viscosity ranging from about 0.05 to about 2.0, it is preferred that said interpolymers have a reduced specific viscosity ranging from about 0.3 to about 1.0. However, interpolymers having a reduced specific viscosity ranging from about 0.5 to about 1.0 are particularly preferred for purposes of this invention.

The alcohols from which the nitrogen-containing esters of this invention are prepared include the high molecular weight alcohol having at least 7 aliphatic carbon atoms, e.g., high molecular weight alcohols having from about 7 to about 40 aliphatic carbon atoms and preferably alcohols having from about 7 to 30 aliphatic carbon atoms or from about 8 to 24 aliphatic carbon atoms. Specific examples of the high molecular weight carboxylic-ester groups, i.e., the $\left(\text{OR}\right)$ group of the ester radical —C(O)OR includes heptyloxy, isooctyloxy, decyloxy, dodecyloxy, tridecyloxy, pentadecyloxy, octadecyloxy, eicosyloxy, tricosyloxy, tetracosyloxy, heptacosyloxy, triacontyloxy, hentriacontyloxy, tetracontyloxy, etc.

In preparing the mixed-esters of the carboxy-interpolymers, one or more of the low molecular weight alcohols having from 1 to 6 aliphatic carbon atoms may be used separately or in combination with the high molecular weight aliphatic alcohols. Specific examples of the low molecular weight ester groups, i.e., the $\left(\text{OR}\right)$ group, include methyloxy, ethyloxy, n-propyloxy, isopropyloxy, n-butyloxy, sec-butyloxy, isobutyloxy, n-pentaloxy, neo-pentyloxy, n-hexaloxy, cyclohexyloxy, cyclopentyloxy, 2-methyl-butyl-1-oxy, 2,3-dimethylbutyl-1-oxy, etc. Although the nitrogen-containing esters may be prepared from one or more of the high molecular weight aliphatic alcohols, it is also advantageous to prepare a nitrogen-containing mixed ester from mixtures or a combination of high molecular weight and low molecular weight aliphatic alcohols. Other substituents, i.e., polar substituents, etc., which may be present in the ester radicals of the nitrogen-containing esters in amounts ranging from about 0 to about 10 molar percent may include, for example, the chloro, bromo, ether, nitro, etc., and various combinations thereof. In preparing the mixed esters, the high molecular weight aliphatic alcohol may be used in an amount ranging from about 1.0 to 10 moles of said high molecular weight alcohol for each 1.0 mole of the low molecular weight alcohol. Preferably, however, the mixed esters are prepared from alcohols wherein the high molecular weight aliphatic alcohol is present in an amount ranging from about 2 to 9 moles of said high molecular weight aliphatic alcohol and preferably from about 2.5 to 5.0 moles of said high molecular weight alcohol for each mole of said low molecular weight aliphatic alcohol.

Moreover, one or more of the high molecular weight and one or more of the low molecular weight alcohols may be reacted either alone or in combination. A preferred class of alcohols includes the commercially available mixtures of alcohols. One class of commercial alcohols includes, the oxoalcohols which comprises, for example, a mixture of alcohols having from about 8–24 carbon atoms. Of the various commercial alcohols, another preferred class of alcohols includes the alcohols having from about 8 to 30 aliphatic carbon atoms. The alcohols may comprise, for example, octyl alcohol, decyl alcohol, dodecyl alcohol, tetradecyl alcohol, pentadecyl alcohol, eicosyl alcohol, octadecyl alcohol, etc.

The carbonyl-polyamino groups of the nitrogen-containing esters of this invention comprise the groups derived from hydrazine and/or a hydrocarbon-substituted hydrazine including, for example, the mono-, di-, tri-, and tetrahydrocarbon-substituted hydrazines wherein the hydrocarbon substituent is either an aliphatic or aromatic substituent including, for example, the alkyl-, e.g., cyclic and/or acyclic groups, aryl-, alkylaryl-, aralkyl, etc. The hydrocarbon substituents, generally, contain up to about 24 aliphatic carbon atoms and preferably up to about 12 aliphatic carbon atoms. The preferred substituents, however, include, for example, phenyl, alkylphenyl or an alkyl group wherein the alkyl is either a methyl, ethyl, propyl, butyl, pentyl, octyl, cyclohexyl, decyl or dodecyl, etc. Other examples of the hydrocarbon groups include octyldecyl, behenyl, benzyl, heptaphenyl, α-naphthyl, β-naphthyl, butyl-naphthyl, oleyl, stearyl, etc. Of the various hydrocarbon-substituted hydrazines, a preferred class includes the N,N-dihydrocarbon-substituted hydrazines, e.g., the dimethyl, diethyl, diphenyl and dibutyl hydrazines.

The carboxy-interpolymers, from which the nitrogen-containing esters are prepared, includes the interpolymers of α,β-unsaturated carboxylic acids, the anhydrides and esters thereof, e.g., maleic acid or its anhydride, itaconic acid or its anhydride, etc., polymerized with styrene or an aliphatic olefin preferably containing from about 2 to 8 carbon atoms. The olefins may include, for example, ethylene, propylene, butylene, isobutylene, etc. Of the various interpolymers, a particularly preferred interpolymer includes the styrene-maleic acid or the anhydride interpolymers obtained by polymerizing approximately equimolar proportions of styrene and maleic acid or its anhydride with or without the addition of one or more interpolymerizable comonomers. If a comonomer is desirable, said comonomer may be present in a relatively minor proportion ranging from zero up to about 0.3 mole and preferably in amounts ranging from about zero up to about 0.15 mole for each mole of either one of the other monomers, e.g., the styrene or the maleic acid, etc. The comonomers may include, preferably, vinyl acetate, acrylonitrile, methylacrylate, methyl methacrylate, acrylic acid, vinylmethyl ether, vinylethyl ether, vinylchloride, isobutene either alone or in combination with various other interpolymerizable comonomers known in the art. It is obvious that in place of styrene, any one or more of the lower molecular weight olefins, e.g., $C_2$-$C_4$ aliphatic olefins, may be used in preparing the carboxy interpolymers. Moreover, in place of the dicarboxylic unsaturated acids, a monocarboxylic acid including, for example, acrylic, methacrylic, etc., the anhydrides and esters thereof may be used to prepare the carboxy interpolymers.

The various methods for polymerizing the olefins and/or styrene with the unsaturated carboxylic acids or a derivative thereof per se are known in the art. The nitrogen-containing esters and/or mixed esters of the carboxy interpolymers of this invention may be prepared, for example, by a process which comprises, initially, esterifying at least about 50 molar percent and preferably from about 50 to 98 or 75 to 95 molar percent of the carboxy radicals of said interpolymer with one or more of the alcohols to obtain the corresponding ester groups. Subsequently, the unesterified carboxylic radicals are reacted with a small but effective amount of hydrazine or a hydrocarbon-substituted hydrazine. The hydrazines may be used in the form of a hydrate, hydrohalide, sulfate, hydrosulfate, etc.

If desirable, the hydroxy compound used for esterifying the carboxy interpolymer may include a high molecular weight alcohol having at least 7 aliphatic carbon atoms, e.g., 7–40 aliphatic carbon atoms, and a low molecular weight alcohol having from 1–6 aliphatic carbon atoms.

When utilizing a mixture of high and low molecular weight alcohols in the process, the relative proportion of said alcohols may comprise, for example, from about 50 to 100 molar percent and preferably from 60 to 90 molar percent of the high molecular weight aliphatic alcohol and zero to 50 molar percent and preferably 10 to 40, e.g., 5 to 25 molar percent of the low molecular weight alcohol.

When utilizing a combination of a high molecular weight and a low molecular weight alcohol, the esterification may be carried out, for example, by initially esterifying at least about 50 molar percent and preferably from about 50 to 75% of the carboxy radicals with the high molecular weight alcohol and then subsequently esterifying the partially-esterified carboxy interpolymer with a low molecular weight alcohol, e.g., 2–4 aliphatic carbon atoms, to obtain a carboxy interpolymer having approximately 50–75 molar percent of the carboxylic groups esterified with the high molecular weight aliphatic alcohol and approximately 23–48 molar percent of the carboxy radicals esterified with the low molecular weight aliphatic alcohol. For example, esterification with a combination of high and low molecular weight alcohols may be accomplished, in sequence, by first carrying out the esterification with the high molecular weight alcohol, e.g., up to about 75 molar percent and subsequently esterifying up to about 98 molar percent of the carboxylic groups with the low molecular weight alcohol. Alternatively, the carboxylic groups of the interpolymer may be simultaneously esterified with a mixture of the alcohols to obtain an esterified-carboxy interpolymer having up to about 60, 70, 80, 90, 95 or 98 mole percent of the carboxylic groups esterified with the high and low molecular weight aliphatic alcohols.

Following esterification of the carboxy groups of the interpolymer with either one or more of the high and low molecular weight alcohols, at least about 2.0 molar percent and approximately 2.0 to 50 molar percent and preferably from about 5 to 25 molar percent of the carboxy groups of said interpolymer may be reacted with hydrazine or a hydrocarbon-substituted hydrazine at temperatures ranging from about 80° to 300.°C. The reaction temperatures may range from about 80°C. to 350°C. or higher provided that said temperature is maintained below the decomposition point of either the reactants or the products obtained thereof. Thus, for example, at least about 50 mole percent, e.g., 50–98 mole percent, of the carboxyl groups of a styrenemaleic interpolymer may be esterified with a high molecular weight aliphatic alcohol and then subsequently reacted with hydrazine, etc., to obtain a nitrogen-containing ester having about 2.0 to 50 or 2.0 to 35 molar percent of the carboxylic groups converted to carbonyl-polyamino groups. If a mixture of alcohols including the high molecular weight and low molecular weight alcohols is used to esterify the carboxyl groups of said interpolymer, then at least about 2.0 molar percent of the carboxyl groups of said interpolymer are reacted with hydrazine or a hydrocarbon-substituted hydrazine to obtain the carbonyl-polyamino groups. For purposes of this invention, it is sufficient to have at least about 2.0 molar percent and preferably at least about 5 molar percent of the carboxylic groups, i.e., carboxylic-acid groups, etc., of the carboxy-interpolymer reacted with hydrazine, etc., to obtain the carbonyl-polyamino groups. The carbonyl-polyamino groups may be characterized as comprising amides, imides, amidines, salts or mixtures thereof, depending upon the particular reactants and the conditions, e.g., temperatures, etc., under which the reaction is conducted.

While it is generally desirable to convert approximately 50 to 98 molar percent of the carboxylic groups of said interpolymer to ester groups, it is preferred to esterify approximately 75 to 95 molar percent of the carboxy groups of said interpolymer with said alcohols and react the remaining carboxylic groups with hydrazine or a hydrocarbon substituted hydrazine to obtain the nitrogen-containing esters. These nitrogen-containing esters may be further characterized as being substantially free of any carboxylic groups, e.g., from 0 to 5 molar percent or less than 2.0 molar percent of carboxylic acid groups, etc. For purposes of this invention, the reaction may be carried out in the presence of an excess amount, e.g., from about 0-10 molar percent excess of the alcohols to facilitate esterification. Moreover, the esterification may be carried out in the presence of one or more solvents including, for example, mineral oil, toluene, benzene, xylene or other organic fluids either alone or in combination with a catalyst. These catalysts are wellknown and may be used in catalytic amounts and include esterification catalysts such as toluene sulfonic acid, sulfuric acid, aluminum chloride, boron trifluoride-triethylamine, hydrochloric acid, ammonium sulfate, phosphoric acids, sodium methoxide, etc.

One process for preparing the nitrogen-containing esters includes, for example, initially reacting the carboxy interpolymer with the relatively high molecular weight alcohol, e.g., aliphatic alcohol having 8 to 24 aliphatic carbon atoms and then subsequently reacting the partially-esterified interpolymer with a relatively low molecular weight aliphatic alcohol. Another variation of the process includes initiating the esterification with the high molecular weight alcohol and prior to completion of the esterification, the low molecular weight alcohol is introduced into the reaction to obtain mixed esterification. Further, it has been found that a two-step esterification process may be used whereby the carboxy interpolymer is initially esterified with the high molecular weight alcohol to convert approximately 50 to about 75 mole percent of the carboxy groups to the corresponding ester and then subsequently reacting the relatively low molecular weight alcohol with the partially-esterified interpolymer to achieve the degree of esterification desired, e.g., ranging up to about 99 molar percent of the carboxy groups. Following the esterification reaction, said partially-esterified-carboxy interpolymer is reacted with hydrazine and/or a hydrocarbon-substituted hydrazine to obtain the nitrogen-containing esters or mixed esters. The alcohol-esterified interpolymer is generally reacted with hydrazine or a hydrocarbon-substituted hydrazine to substantially neutralize all of the unesterified carboxy radicals of the interpolymer. The neutralization with hydrazine is preferably carried out at temperatures of at least about 80°C. and preferably at temperatures ranging from about 100°-350°C. In most instances, however, the neutralization reaction takes place at temperatures ranging from about 150°-250°C. in the presence of an excess of the hydrazine. A stoichiometric excess is particularly useful where it is desirable to neutralize substantially all of the unesterified carboxy radicals present in the carboxy interpolymer. For example, if an excess of hydrazine is used substantially all of the unesterified carboxy radicals may be neutralized except for about 0 to 5 and more likely from about 0–2 molar percent.

The following embodiments illustrate the nitrogen-containing esters and a process for preparing said esters for purposes of this invention.

EXAMPLE 1

A carboxy interpolymer is obtained by preparing a solution of styrene (16.3 parts by weight) and maleic anhydride (12.9 parts by weight) in a benzene-toluene solution (270 parts; weight ratio of benzene to toluene being 66.5 to 33.5) and contacting the solution at 86°C. in nitrogen atmosphere for 8 hours with a catalyst solution prepared by dissolving 70% benzoyl peroxide (0.42 part by weight) in a similar benzene-toluene mixture (2.7 parts by weight). The resulting product is a thick slurry of the interpolymer in the solvent mixture. To the slurry there is added mineral oil (141 parts by weight) while the solvent mixture is being distilled off at 150°C. and then at 150°C/200 mm Hg. To 209 parts by weight of the stripped mineral oil-interpolymer slurry (the interpolymer having a reduced specific viscosity of 0.72) there are added toluene (25.2 parts by weight), n-butyl alcohol (4.8 parts by weight), a commercial alcohol consisting essentially of primary alcohols having from 12 to 18 carbon atoms (56.6 parts by weight) and a commercial alcohol consisting of primary alcohols having from 8 to 10 carbon atoms (10 parts by weight) and to the resulting mixture there is added 96% sulfuric acid (2.3 parts by weight). The mixture is then heated at 150°–160°C. for 20 hours whereupon water is distilled off. An additional amount of sulfuric acid (0.18 part by weight) together with an additional amount of n-butyl alcohol (3.0 parts by weight) is added and the esterification is continued until 95% of the carboxy radicals of the polymer has been esterified. To the esterified interpolymer (400 parts by weight), there is then added hydrazine (64% aqueous solution)(2.7 parts by weight) and the resulting mixture is heated to 150°C. and then to 150°C/100 mm Hg. to distill off volatile components. The stripped product is mixed with mineral oil (126 parts by weight) and filtered. The filtrate is a mineral oil solution of the nitrogen-containing ester.

EXAMPLE 2

The procedure of Example 1 is followed except that the esterification is carried out in two steps; the first step being the esterification of the styrene-maleic interpolymer with the commercial alcohols having from 8 to 18 carbon atoms and the second step being the further esterification of the interpolymer with n-butyl alcohol.

EXAMPLE 3

The procedure of Example 1 is followed except that the esterification is carried out by first esterifying the styrene-maleic interpolymer with the commercial alcohols having from 8 to 18 carbon atoms until 70% of the carboxyl radicals of the interpolymer have been converted to ester radicals and thereupon continuing the esterification with any unreacted commercial alcohols and n-butyl alcohol until 95% of the carboxyl radicals of the interpolymer have been converted to ester radicals.

EXAMPLE 4

The procedure of Example 1 is followed except that the interpolymer is prepared by polymerizing a solution consisting of styrene (416 parts by weight), maleic anhydride (392 parts by weight) in benzene (2153 parts by weight) and toluene (5025 parts by weight) in the presence of benzoyl peroxide (1.2 parts by weight) at 65°–106°C. The resulting interpolymer has a reduced specific viscosity of 0.45.

EXAMPLE 5

The procedure of Example 1 is followed except that the styrene-maleic anhydride is obtained by polymerizing a mixture of styrene (416 parts by weight), maleic anhydride (392 parts by weight), benzene (6101 parts by weight) and toluene (2310 parts by weight) in the presence of benzoyl peroxide (1.2 parts by weight) at 78°–92°C. The resulting interpolymer has a reduced specific viscosity of 0.91.

EXAMPLE 6

The procedure of Example 1 is followed except that the styrene-maleic anhydride is prepared by the following procedure: Maleic anhydride (392 parts by weight) is dissolved in benzene (6870 parts by weight). To this mixture there is added styrene (416 parts by weight) at 76°C. whereupon benzoyl peroxide (1.2 parts by weight) is added. The polymerization mixture is maintained at 80°–82°C. for about 5 hours. The resulting interpolymer has a reduced specific viscosity of 1.24.

EXAMPLE 7

The procedure of Example 6 is followed except that acetone (1340 parts by weight) is used in place of benzene as the polymerization solvent and that azobisisobutyronitrile (0.3 part by weight) is used in place of benzoyl peroxide as a polymerization catalyst.

EXAMPLE 8

The procedure of Example 1 is followed except that the styrene-maleic anhydride interpolymer is prepared as follows: To a solution of maleic anhydride (69 parts by weight) in benzene (805 parts by weight) at 50°C. there is added styrene (73 parts by weight). The resulting mixture is heated to 83°C. whereupon benzoyl peroxide (0.19 part by weight) is added and then maintained at 80°–85°C. The resulting interpolymer has a reduced specific viscosity of 1.64.

EXAMPLE 9

The procedure of Example 1 is followed except that toluene sulfonic acid (3.5 parts by weight) is used in place of sulfuric acid as the esterification catalyst.

EXAMPLE 10

The procedure of Example 1 is followed except that phosphoric acid (2.5 parts by weight) is used in place of sulfuric acid as the esterification catalyst.

EXAMPLE 11

The procedure of Example 1 is followed except that dodecyl alcohol (0.9 mole per carboxy equivalent of the styrene-maleic anhydride interpolymer) is used in place of the alcohol mixture having 8–18 carbon atoms and the n-butyl alcohol.

EXAMPLE 12

The procedure of Example 1 is followed except that eicosyl alcohol (0.8 mole consumed per carboxy equivalent of interpolymer) is used in place of the commercial alcohols having from 8 to 18 carbon atoms and n-pentyl alcohol (0.15 mole consumed per carboxy equivalent of the interpolymer) is used in place of the n-butyl alcohol.

EXAMPLE 13

The procedure of Example 1 is followed except that octyl alcohol (0.8 mole consumed per carboxy equivalent of the interpolymer) is used in place of the commercial alcohols having from 8 to 18 carbon atoms, isopentyl alcohol (0.1 mole consumed per carboxy equivalent of the interpolymer) is used in place of then-butyl alcohol, and N,N-dimethyl hydrazine (0.1 mole consumed per carboxy equivalent of the interpolymer) is used in place of the hydrazine.

EXAMPLE 14

The procedure of Example 1 is followed except that N,N-diphenyl hydrazine is substituted for the hydrazine used on a molar basis.

EXAMPLE 15

The procedure of Example 1 is followed except that N-methyl-N'-butyl hydrazine is substituted for the hydrazine on a molar basis.

EXAMPLE 16

An interpolymer (0.86 carboxyl equivalent) of styrene and maleic anhydride (prepared from an equal molar mixture of styrene and maleic anhydride and having a reduced specific viscosity of 0.67–0.68) is mixed with mineral oil to form a slurry, and then esterified with a commercial alcohol mixture (0.77 mole; comprising primary alcohols having from 8 to 18 carbon atoms) at 150°–160°C. in the presence of a catalytic amount of sulfuric acid until about 70% of the carboxyl radicals are converted to ester radicals. The partially esterified interpolymer is then further esterified with n-butyl alcohol (0.31 mole) until 95% of the carboxyl radicals of the interpolymer are converted to the mixed ester radicals. The esterified interpolymer is then treated with N,N-dibutyl hydrazine (slight excess of the stoichiometric amount to neutralize the free carboxyl radicals of the interpolymer) at 150°–160°C. until the resulting product is substantially neutral (acid number of 1 to phenolphthalein indicator). The resulting product is mixed with mineral oil so as to form an oil solution containing 34% of the polymeric product.

The nitrogen-containing esters of this invention may be employed effectively in a variety of oleaginous materials, including, for example, lubricating oil compositions, e.g., crankcase oils for spark-ignited and compression-ignited internal combustion engines, i.e., automobile and truck engines, two-cycle engine lubricants, marine and railroad diesel engines and the like. In addition, automatic transmission fluids, trans-axle lubricants, metalworking lubricants, hydraulic fluids and various other lubricating compositions and fuels may be improved by the addition thereto of a small but effective amount of the nitrogen-containing esters of this invention.

More specifically, the nitrogen-containing esters and/or mixed esters of the carboxy interpolymers may be employed in effective amounts as an additive, e.g., an anti-sludge and viscosity-index improving agent, in either synthetic or mineral lubricating oils, and fuels, e.g., normally liquid hydrocarbon fuels, such as gasoline, diesel fuel, kerosene, etc. Effective amounts range from at least about 0.001% by weight and preferably from about 0.001% to about 25% by weight of the total composition. Preferably, however, the nitrogen-containing esters may be added to lubricating oils or fuels, etc., in amounts ranging from about 0.01% to 15% or 0.1% to about 10% by weight of the composition. The optimum amount added to a particular lubricant or fuel will depend upon the particular type of surface or conditions to which the lubricant or fuel is to be subjected. If, for example, the nitrogen-containing esters are to be added to a gasoline for an internal combustion engine, the amount employed may range from about 0.001% to 1.0% by weight. If, however, the nitrogen-containing esters are to be added to a gear lube or a diesel lubricant, etc., the amount employed may range as high as 25% by weight of the total composition. In some instances, even larger percentages, e.g., up to about 30% by weight of the nitrogen-containing esters may be employed depending upon the ultimate use of the composition.

The following compositions illustrate the lubricants and fuels for purposes of this invention.

EXAMPLE A

SAE 10W-30 mineral base oil containing 0.05% by weight of the product of Example 1.

EXAMPLE B

SAE 20 mineral lubricating oil containing 0.1% by weight of the product of Example 16.

EXAMPLE C

SAE 20W-30 mineral lubricating oil containing 2.5% by weight of the product of Example 3 and 2% by weight of calcium dicyclohexylphosphorodithioate.

EXAMPLE D

ATF mineral base oil containing 4% by weight of the product of Example 13, 0.2% by weight of the reaction product of an ethoxylated dodecylamine and boron oxide, 0.8% by weight of sulfurized sperm oil, and 0.95% by weight of a carbonated basic-metal complex prepared by carbonating a mixture of sperm oil and an excess of barium hydroxide in the presence of butylphenol, as the promoter.

EXAMPLE E

SAE 10W-30 mineral lubricating oil containing 6% by weight of the product of Example 12, 0.1% by weight of phosphorus as zinc dioctylphosphorodithioate, 5% by weight of a barium sulfonate prepared by carbonating a mixture of barium mahogany sulfonate and an excess of barium oxide in the presence of water and octylphenol as the promoter.

EXAMPLE F

ATF mineral base oil containing 2.5% by weight of the product of Example 1, 2% by weight of the reaction product of tetraethylene pentamine and polyisobutene (molecular wiehg of 1000)-substituted succinic anhydride, 2% by weight of didecylphosphite and 3% by weight of a basic metal-complex prepared by carbonating polyisobutene (molecular weight of 300)-substituted salicyclic acid and an excess of calcium hydroxide in the presence of methyl alcohol and acetic acid, as the promoter.

As stated, the nitrogen-containing esters are capable of imparting anti-sludge and anti-varnish properties while maintaining the desired viscosity characteristics of the lubricant. With regard to the anti-sludge characteristics, the nitrogen-containing esters may function as an oxidation inhibitor and a dispersant thereby keeping the metal parts of the engine free from harmful deposits. With regard to the viscosity characteristics, the nitrogen-containing esters increase the viscosity index of the lubricant and thereby extends the versatility of the lubricant for use at both high and low temperatures. A particularly desirable and unique property of the nitrogen-containing esters is their effectiveness to provide anti-varnish and anti-sludge protection under the high temperature conditions normally encountered in the operation of a diesel engine. Moreover, the viscosity index properties are particularly important to the automatic transmission fluids and therefore are effective in maintaining the desired viscosity index of these fluids under actual service conditions. For example, a stringent requirement of an automatic transmission fluid is the relatively narrow limits of viscosity values. The so-called DEXRON specification for automatic transmission fluids has a requirement with respect to low temperature viscosity characteristic and places a maximum viscosity of about 55,000 centipose at $-40°F$. These requirements should be met by the use of viscosity index improving agents which must be effective to increase the viscosity index of the fluid but must not cause an excessive thickening of the fluid. Thus, one of the important characteristics of the nitrogen-containing esters of this invention is that they not only improve the viscosity index of a lubricant but they also do not cause an excessive thickening of the lubricant, at the required concentration, at comparatively low temperatures.

The anti-sludge properties of the nitrogen-containing esters of this invention may be illustrated, for example, by a test which comprises preparing a 350 cc. lubricant sample comprising a Mid-Continent, conventionally-refined lubricating oil having a viscosity of about 200 SUS at 100°F. and containing 0.008% by weight of iron naphthanate as a promoter of oil degradation and 1.5% by weight of the additive to be tested. The lubricant sample is placed in a 2 inch × 15 inch borosilicate tube. A 1-⅜ inch × 5-⅞ inch SAE 1020 steel panel is immersed in the oil. The sample is heated at 300°F. for 96 hours while air is bubbled through the oil at a rate of 10 liters per hour. The oxidized sample is cooled, mixed with 0.5% by volume of water, homogenized, allowed to stand at room temperature for 24 hours and then filtered through 2 layers of filter paper. The precipitate is washed with naphtha and dried. The weight of the precipitate, adjusted to milligrams per 100 cc. of oil tested, is taken as a measure of the effectiveness of the anti-sludge additive, i.e., the greater the weight of the precipitate the less effective the additive. The results of this test are shown in Table I (Base Oil: greater than 700 mg. of sludge/100 ml. of oil).

TABLE I

Anti-Sludge Test

| Additive Present in The Lubricant | Additive Concentration (% weight) | Sludge (mg/100 ml. of Test Oil) |
|---|---|---|
| A) The carboxy interpolymer of Example 1 esterified with the alcohols therein and reacted with hydrazine | 1.5 | 21.3 |
| B) The carboxy interpolymer of Example 1 esterified with the alcohols therein and reacted with N,N-dimethyl hydrazine | 1.5 | 13 |

In addition to the nitrogen-containing esters of this invention, it is obvious that other known additives may be used in combination with the esters in fuels or lubricants, etc. These additives may include, for example, detergents of the ash-containing type, dispersants of the ashless-type, other viscosity-index improving agents, pourpoint depressing agents, anti-foam agents, extreme-pressure agents, rust-inhibiting agents, oxidation and corrosion inhibiting agents, and various mixtures of these materials in various proportions. More particularly, the ash-containing detergents may be illustrated by the oil soluble neutral and basic salts of the alkali or alkaline earth metals of the sulfonic acids, carboxylic acids, or the organic phosphorus acids. An additive may be prepared, for example, by the reaction of an olefin polymer, e.g., polyisobutene, having a molecular weight of about 2000 with a phosphorizing agent including, for example, phosphorus trichloride, phosphorus heptasulfide, phosphorus pentasulfide, phosphorus trichloride and sulfur, white phosphorus, and a sulfur halide or phosphorothioic chloride. The compositions most commonly used, however, are the salts of sodium, potassium, lithium, calcium, magnesium, strontium, barium and various mixtures thereof.

A specific method for preparing the basic salts, comprises heating a mineral oil solution of the acid with a stoichiometric excess of a metal neutralizing agent, e.g., a metal oxide, hydroxide, carbonate, bicarbonate, sulfide, etc., at temperatures above about 50°C. In addition, various promoters may be used in the neutralizing process to aid in the incorporation of the excess of metal. These promoters are presently known and include compounds as the phenolic compounds, e.g., phenols, naphthols, alkylphenols, thiophenols, sulfurized alkylphenols, and the various condensation products of formaldehyde with the phenolic compounds, e.g., alcohols such as methanol, 2-propanol, octyl alcohol, cellosolve, carbitol, ethylene glycol, stearyl alcohol and cyclohexyl alcohol; amines such as aniline, phenylene-diamine, phenothiazine, phenyl-betanaphthylamine, and dodecyl amine, etc., A particularly effective process for preparing the basic salts comprises mixing the acid with an excess of the alkaline earth metal in the presence of the phenolic promoter and a small amount of water and carbonating the mixture at an elevated temperature, e.g., 60°C. to about 200°C.

The extreme pressure agents, corrosion-inhibiting and oxidation-inhibiting agents are exemplified by the chlorinated aliphatic hydrocarbons such as chlorinated wax; organic sulfides and polysulfides such as benzyl disulfide, bis(chlorobenzyl)disulfide, dibutyl tetrasulfide, sulfurized sperm oil, sulfurized methyl ester of oleic acid, sulfurized alkylphenol, sulfurized dipentene, sulfurized terpene, etc.; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl-4-pentylphenyl phosphite, polypropylene (molecular weight 500)-substituted phenyl phosphite, diisobutyl substituted phenyl phosphite; metal thiocarbamates such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, the zinc salt of a phosphorodithioic acid produced by the reaction of phosphorus pentasulfide with an equimolar mixture of isopropyl alcohol and n-hexyl alcohol, etc.

The fuel or lubricating compositions may contain a metal detergent additive in amounts ranging from about 0.001% to about 15% by weight. In some applications, e.g., in lubricating marine diesel engines, the lubricating compositions may contain as much as 30% of a detergent additive. The compositions, e.g., lubricants or fuels, etc., may contain extreme-pressure agents, viscosity-index improving agents, pour-point depressing agents, etc., each in amounts ranging from about 0.001% to 15% and preferably in amounts of 0.1% to about 10%. One or more of the above-mentioned additives may be used either alone or in combination in various compositions, e.g., fuels or lubricating oils, with about 0.001% to about 25% by weight of the esters of this invention.

The automatic transmission fluids employing the nitrogen-containing esters of this invention may contain, for example, a frictional additive to improve the so-called slip-stick characteristics. These additives are exemplified by the fatty amines such as stearyl amine, oleyl amine, alkoxylated amines, e.g., the reaction products of the amines with ethylene oxide, propylene oxide and other derivatives of amines such as reaction products of an alkoxylated amine with boric acid, boron oxide, etc. Still other additives which may be used in combination with the esters include sperm oil, sulfurized sperm oil, stearylamide, methyloleate and various other oily agents.

The fuels and oleaginous materials or oils to which the additives may be added, e.g., lubricants, include the animal and vegetable oils, e.g., castor oil, lard oil, etc., as well as the solvent-refined or acid-refined mineral lubricating oils of the paraffinic, naphthenic, or mixed paraffinic-naphthenic types. Oils of lubricating viscosity derived from coal or shale are useful base oils. The synthetic lubricating oils include the hydrocarbon oils and halo-substituted hydrocarbon oils such as polymerized and interpolymerized olefins (e.g., polybutylenes, propyleneisobutylene copolymers, chlorinated polybutylenes, etc.); alkyl benzenes (e.g., dodecylbenzene, tetradecyl benzene, dinonylbenzene, di-(2-ethylhexyl)-benzene, etc.); polyphenyls (e.g., biphenyls, terphenyls, etc.) and the like. The alkylene oxide polymers and interpolymers and derivatives thereof where the terminal hydroxyl groups have been modified by esterification, etherification, etc., comprise another class of known synthetic lubricating oils. These are exemplified by the oils prepared by polymerization of ethylene oxide, propylene oxide, the alkyl and aryl ethers of these polyoxyalkylene polymers, e.g., methyl-polyisopropylene glycol ether having an average molecular weight of 1000, diphenyl ether of polyethylene glycol having a molecular weight 500 to 1000, diethyl ether of polypropylene glycol having a molecular weight of 1000 to 1500, etc., or mono- and polycarboxylic esters thereof, for example, the acetic acid esters, mixed $C_3$-$C_8$ fatty acid esters or the $C_{13}$Oxo acid diester of tetraethylene glycol, etc.

Other synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of 2-ethyl-hexanoic acid and the like.

Silicone-based oils such as the polyalkyl-, polyaryl-, polyalkoxy-, or polyaryloxy- siloxane oils and silicate oils comprise another class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)-silicate, hexyl-(4-methyl-2-pentoxy)-disiloxane, poly(methyl)-disiloxanes, poly(methyl-phenyl)-siloxanes, etc.). Other synthetic lubricants include the liquid esters of phosphorus-containing acids (e.g., tricresyl phosphate, trioctyl phosphate, diethyl ester of decane phosphonic acid, etc.), polymeric tetrahydrofurans and the like.

While this invention is described with a number of specific embodiments, it is obvious that there are other variations and modifications which can be made without departing from the spirit and scope of the invention as particularly set forth in the appended claims.

What is claimed is:

1. A lubricant or fuel composition comprising a major proportion of a lubricating oil or a normally liquid fuel and a minor proportion of an additive sufficient to impart viscosity index and dispersant properties to the composition, said additive being a nitrogen-containing ester of a carboxy-interpolymer having a reduced specific viscosity ranging from about 0.05 to about 2.0, said interpolymer being derived from the interpolymerization of at least one monomer selected from the group consisting of aliphatic olefins having from 2 to about 8 aliphatic carbon atoms and styrene, and at least one monomer selected from the group consisting of an $\alpha,\beta$-unsaturated aliphatic carboxylic acid, the anhydride or an ester thereof; and said interpolymer having (A) pendant carboxylic-ester groups derived from the esterification of the carboxy groups of the interpolymer with at least one high molecular weight alcohol having at least 7 aliphatic carbon atoms, and (B) pendant carbonylpolyamino groups derived from the reaction of the carboxy groups of the interpolymer with hydrazine or a hydrocarbon-substituted hydrazine; wherein the molar ratio of (A):(B) is in the range of from about 2:1 to about 50:1.

2. The lubricant or fuel composition of claim 1, wherein the molar ratio of the carboxylic-ester groups (A) to the carbonyl-polyamino groups (B) is in the range of from about 3:1 to about 20:1.

3. The lubricant or fuel composition of claim 1, wherein the carboxy-interpolymer is derived from styrene and maleic acid or the anhydride thereof, and has a reduced specific viscosity of from about 0.3 to about 1.0.

4. The lubricant or fuel composition of claim 1, wherein the carboxy-ester groups are derived from a high molecular weight alcohol having from 7 to about 40 aliphatic carbon atoms and the carbonyl-polyamino groups are derived from a N,N-dihydrocarbon-substituted hydrazine.

5. The lubricant or fuel composition of claim 1, wherein the carbonyl-polyamino groups are derived from hydrazine.

6. The lubricant or fuel composition of claim 1, wherein the carboxy-interpolymer is derived from the interpolymerization of about 1.0 molar proportion of styrene, about 1.0 molar proportion of maleic acid or anhydride, and from about 0 to about 0.3 molar proportion of at least one vinyl monomer.

7. The lubricant or fuel composition of claim 6, wherein the vinyl monomer comprises vinyl acetate.

8. The lubricant or fuel composition of claim 1, wherein the carboxy-ester groups are derived from a high molecular weight alcohol having from 7 to about 24 aliphatic carbon atoms.

9. The lubricant or fuel composition of claim 1, wherein the carboxy-interpolymer is derived from a low molecular weight aliphatic olefin and maleic acid or the anhydride thereof.

10. The lubricant or fuel composition of claim 1, wherein the carboxy-interpolymer is derived from styrene and maleic acid or the anhydride thereof.

11. The lubricant or fuel composition of claim 1, wherein the nitrogen-containing ester was prepared by esterifying at least about 50 mole percent of the carboxy groups of the carboxy-interpolymer with a high molecular weight alcohol having at least 7 aliphatic carbon atoms to obtain a partially esterified carboxy-interpolymer and subsequently reacting said partially esterified carboxy-interpolymer with an amount of hydrazine or a hydrocarbon-substituted hydrazine sufficient to neutralize the unesterified carboxy groups of the interpolymer.

12. The lubricant or fuel composition of claim 11, wherein the nitrogen-containing ester has from about 50 to 98 mole percent of the carboxy groups esterified with the high molecular weight alcohol.

13. The lubricant or fuel composition of claim 1, wherein the nitrogen-containing ester of the carboxy-interpolymer is present in an amount ranging from about 0.001% to about 25% by weight.

14. A lubricant or fuel composition comprising a major proportion of lubricating oil or normally liquid fuel and a minor proportion of an additive sufficient to impart viscosity index and dispersant properties to the composition, said additive being a nitrogen-containing ester of a styrene-maleic acid interpolymer having a reduced specific viscosity ranging from about 0.05 to about 2.0, the interpolymer being substantially free of carboxylic-acid groups and having (A) pendant carboxylic-ester groups derived from the esterification of the carboxy groups of the interpolymer with at least one high molecular weight alcohol having from 7 to about 24 carbon atoms, and (B) pendant carbonyl-polyamino groups derived from the reaction of the carboxy groups of the interpolymer with hydrazine or a hydrocarbon-substituted hydrazine; wherein the molar ratio of (A):(B) is in the range of from about 2:1 to about 50:1, and the carboxylic-acid groups are present in the range of from about 0 to 2 molar percent.

15. The lubricant or fuel composition of claim 14, wherein the molar ratio of (A):(B) is from about 3:1 to about 20:1.

16. The lubricant or fuel composition of claim 14, wherein the carboxylic-ester groups are derived from the esterification of about 50 to 98 molar percent of the carboxy groups of the interpolymer with at least one high molecular weight alcohol having from 7 to about 24 aliphatic carbon atoms, and subsequently reacting the partially esterified interpolymer with an amount of hydrazine or a hydrocarbon-substituted hydrazine sufficient to neutralize the unesterified carboxy groups of the interpolymer.

17. The lubricant or fuel composition of claim 14, wherein the nitrogen-containing ester of the interpolymer is present in an amount ranging from about 0.001% to about 25% by weight.

18. A lubricant or fuel composition comprising a major proportion of lubricating oil or normally liquid fuel and from about 0.001% to about 25% by weight of a nitrogen-containing ester of a styrene-maleic acid interpolymer having a reduced specific viscosity ranging from about 0.05 to about 2.0, the interpolymer having (A) pendant carboxylic-ester groups derived from the esterification of the carboxy groups of the interpolymer with at least one alcohol having from 7 to about 24 aliphatic carbon atoms, and (B) pendant carbonyl-polyamino groups derived from the reaction of the carboxy groups of the interpolymer with hydrazine or a hydrocarbon-substituted hydrazine; wherein the molar ratio of (A):(B) is in the range of from about 3:1 to about 20:1.

19. The lubricating composition of claim 18, wherein the nitrogen-containing ester of the interpolymer is present in an amount ranging from about 1.0% to about 25% by weight.

20. The fuel composition of claim 18, wherein the nitrogen-containing ester of the interpolymer is present in an amount ranging from about 0.001% to about 1.0% by weight.

* * * * *